(12) United States Patent
Colquhoun et al.

(10) Patent No.: US 7,736,539 B2
(45) Date of Patent: Jun. 15, 2010

(54) ION-CONDUCTING POLYMERS AND MEMBRANES COMPRISING THEM

(75) Inventors: Howard Matthew Colquhoun, Reading (GB); Zhixue Zhu, Reading (GB); William Alexander Mortimore, Cardiff (GB); Martin Philip Hogarth, Cambridge (GB); Nadia Michele Walsby, Henley-on-Thames (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 10/585,808

(22) PCT Filed: Jan. 12, 2005

(86) PCT No.: PCT/GB2005/000077

§ 371 (c)(1),
(2), (4) Date: Apr. 30, 2007

(87) PCT Pub. No.: WO2005/068536

PCT Pub. Date: Jul. 28, 2005

(65) Prior Publication Data

US 2007/0196734 A1    Aug. 23, 2007

(30) Foreign Application Priority Data

Jan. 13, 2004    (GB)    .................. 0400626.8

(51) Int. Cl.
*H01B 1/00*    (2006.01)
*C08F 283/00*    (2006.01)
*C08G 75/00*    (2006.01)
*C08G 2/00*    (2006.01)

(52) U.S. Cl. .............. 252/500; 525/471; 528/175; 528/220; 528/391

(58) Field of Classification Search ............... 252/500; 525/471; 528/175, 220, 391
See application file for complete search history.

(56) References Cited

U.S. PATENT DOCUMENTS 5,362,836 A * 11/1994 Helmer-Metzmann et al. ......................... 528/125
5,679,482 A    10/1997 Ehrenberg et al.

(Continued)

FOREIGN PATENT DOCUMENTS

EP    0 008 894 A1    3/1980

(Continued)

OTHER PUBLICATIONS

Gary W. Yeager and David N. Schissel, "A Convenient Method for the Preparation of 4-Aryloxyphenols," *Synthesis*, Jan. 1991, pp. 63-68.

*Primary Examiner*—Mark Kopec
*Assistant Examiner*—Jaison P Thomas
(74) *Attorney, Agent, or Firm*—RatnerPrestia

(57) ABSTRACT

An ion-conducting polymer wherein at least 80% of the repeat units comprise an ion-conducting region and a spacer region is disclosed. The ion-conducting region has an aromatic backbone of one or more aromatic groups, wherein at least one ion-conducting functional group is attached to each aromatic group. The spacer region has an aromatic backbone of at least four aromatic groups, wherein no ion-conducting functional groups are attached to the aromatic backbone. The polymer is suitable for use as a fuel cell membrane, and can be incorporated into membrane electrode assemblies.

16 Claims, 6 Drawing Sheets

U.S. PATENT DOCUMENTS

| | | |
|---|---|---|
| 5,693,740 A | 12/1997 | Colquhoun et al. |
| 5,985,477 A | 11/1999 | Iwasaki et al. |
| 6,620,546 B1 | 9/2003 | Michot et al. |
| 2002/0164513 A1* | 11/2002 | Asano et al. .................. 429/32 |
| 2002/0187377 A1* | 12/2002 | Shinoda et al. ............... 429/33 |
| 2003/0032739 A1 | 2/2003 | Kerres et al. |
| 2006/0159972 A1* | 7/2006 | Nodono ....................... 429/30 |
| 2008/0044708 A1* | 2/2008 | Yamaguchi et al. ........... 429/33 |
| 2008/0207781 A1* | 8/2008 | Schuster et al. ............... 521/27 |

FOREIGN PATENT DOCUMENTS

| | | |
|---|---|---|
| EP | 0 041 780 A1 | 12/1981 |
| EP | 1 238 998 A1 | 9/2002 |
| EP | 1 354 907 A1 | 10/2003 |
| EP | 1 612 232 A1 | 1/2006 |
| WO | WO-00/09610 A1 | 2/2000 |
| WO | WO-00/24796 A1 | 5/2000 |
| WO | WO-01/25312 A1 | 4/2001 |
| WO | WO-02/25764 A1 | 3/2002 |
| WO | WO-2004/088778 A2 | 10/2004 |
| WO | WO-2004/088778 A3 | 10/2004 |
| WO | WO-2004/090015 A1 | 10/2004 |

* cited by examiner

ION-CONDUCTING POLYMERS AND MEMBRANES COMPRISING THEM

This application is the U.S. National Phase application of PCT International Application No. PCT/GB2005/000077, filed Jan. 12, 2005, and claims priority of British Patent Application No. 0400626.8, filed Jan. 13, 2004.

FIELD OF THE INVENTION

The present invention relates to novel polymers and membranes comprising the polymers.

BACKGROUND OF THE INVENTION

Sulphonated polyarylethersulphone and polyaryletherketone polymers are useful membrane materials and have been used in filtration processes such as reverse osmosis and nanofiltration. Sulphonated poly(arylene ether sulphone)s have been produced by post-polymerisation sulphonation of commercially available bisphenol-A based poly(ether sulphone):

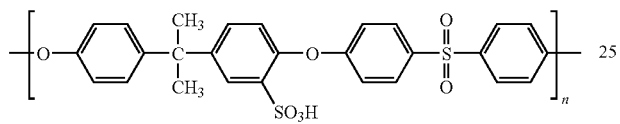

U.S. Pat. No. 5,693,740 discloses sulphonated polyarylethersulphone copolymers of the formula (I):

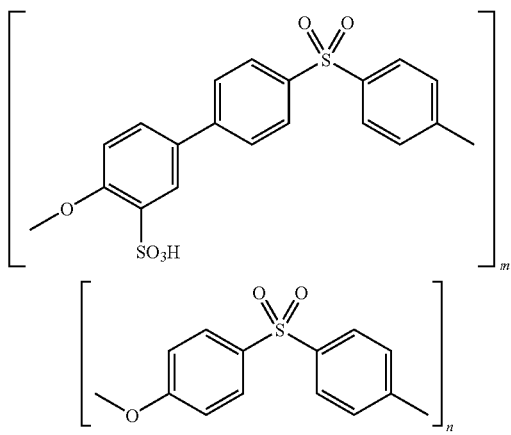

Similar polymers have been disclosed for use as membranes in polymer electrolyte membrane (PEM) fuel cells. The most commonly used polymers in polymer electrolyte membranes are perfluorinated sulphonic acid polymers such as Nafion® and Flemion®. However, the perfluorinated polymers are expensive and have limited ionic conductivity at elevated temperatures (greater than 100° C.). Sulphonated polyarylethersulphone and polyaryletherketone polymers have been investigated as alternative polymer electrolyte membrane materials.

U.S. Pat. No. 5,985,477 discloses a polymer electrolyte comprising a sulphonated copolymer which is obtained by sulphonating a copolymer formed from three monomers:

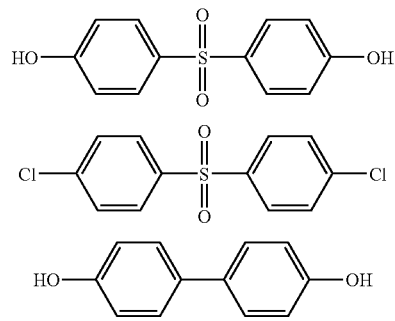

WO 02/25764 discloses a sulphonated copolymer as shown below:

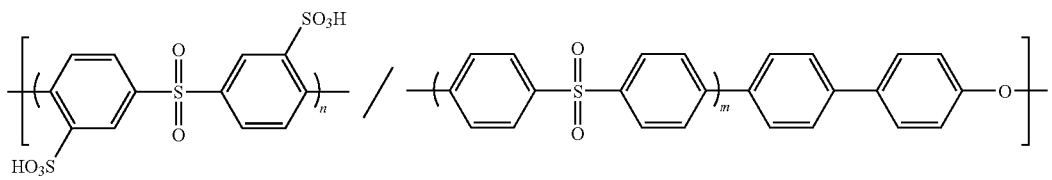

This copolymer is said to provide a polymer electrolyte membrane with improved thermal stability and improved protonic conductivity.

SUMMARY OF THE INVENTION

The present inventors have sought to provide ion-conducting polymers that are suitable for use in PEM fuel cells. The polymers should have appreciable ionic conductivity, and should be stable in a fuel cell environment. The polymers should not dissolve in water at fuel cell temperatures and should be thermally stable at fuel cell temperatures.

Accordingly, the present invention provides a polymer wherein at least 80% of the repeat units comprise
  a) an ion-conducting region having an aromatic backbone of one or more aromatic groups, wherein at least one ion-conducting functional group is attached to each aromatic group; and
  b) a spacer region having an aromatic backbone of at least four aromatic groups, wherein no ion-conducting functional groups are attached to the aromatic backbone.

The polymer is made up of "repeat units", i.e. groups of atoms that are repeated many times along the polymer chain. The polymer may consist of more than one type of repeat unit, but at least 80% of the repeat units comprise both an ion-conducting region and a spacer region.

Preferably at least 80% of the repeat units consist essentially of the ion-conducting region and the spacer region.

DETAILED DESCRIPTION OF THE INVENTION

Figure 1:
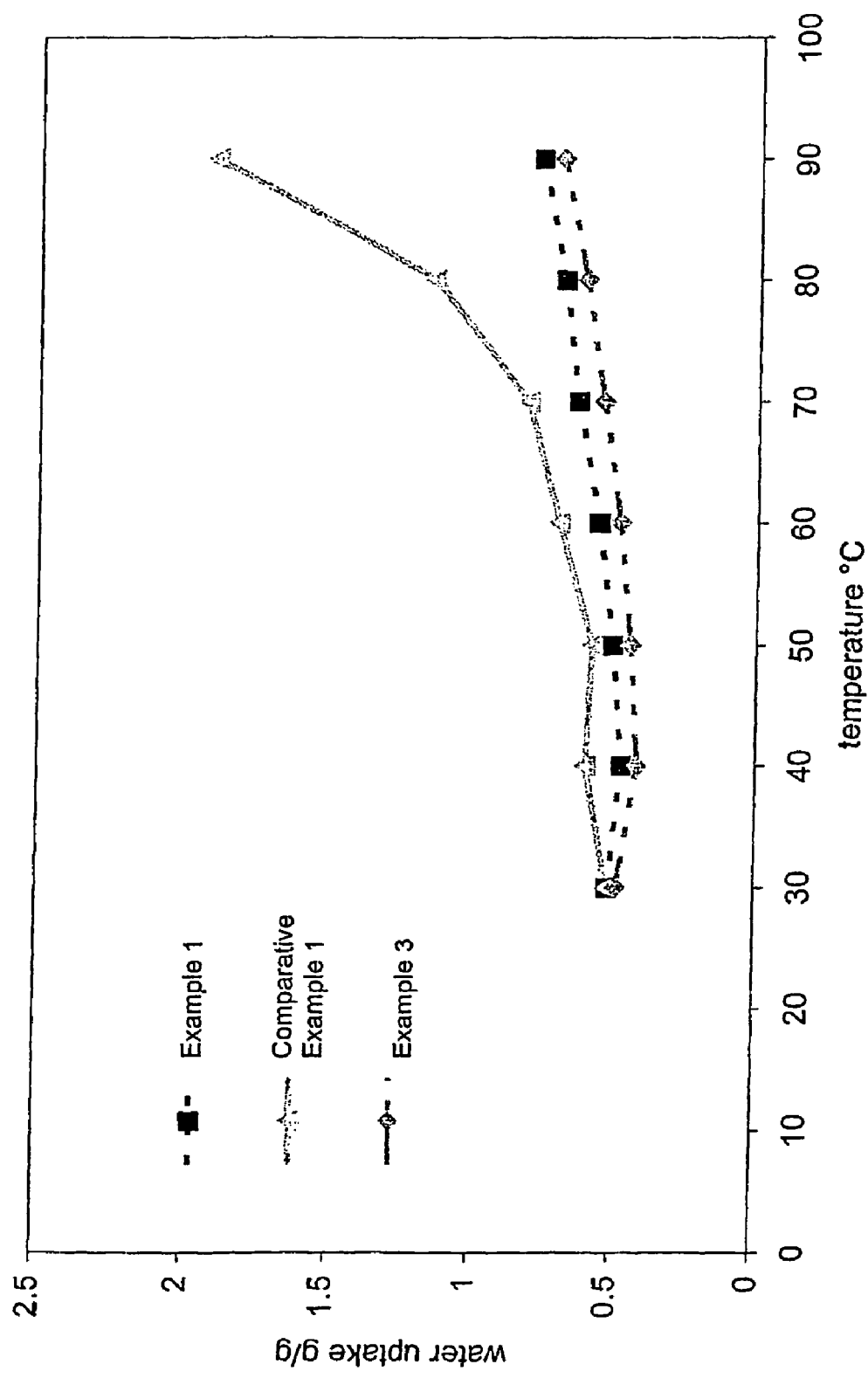
FIG. 1 is a graphical representation of the water uptake for membranes based on data from example 1, comparative example 1, and example 3.

The polymer according to the invention is made up of repeat units wherein at least 80%, suitably at least 95% and preferably all of the repeat units comprise an ion-conducting region and a spacer region. Statistical copolymers made up of ion-conducting repeat units and non-conducting repeat units are known. Such a copolymer would have an irregular distribution of ion-conducting regions and non-conducting regions along the length of the polymer chain. In the polymer according to the invention, at least 80% of the repeat units in the polymer contain an ion-conducting region and a spacer region that is non-conducting. Therefore, most of the polymer chain contains alternate ion-conducting and spacer regions along the length of the chain. The spacing and frequency of the ion-conducting regions and the spacer regions is considerably more regular than in a statistical copolymer.

The aromatic backbone of the ion-conducting region contains one or more aromatic groups and preferably contains one to three aromatic groups, most preferably one or two aromatic groups. The aromatic groups may be phenylene, napthylene or anthracenylene groups, but are preferably phenylene groups. Preferably each aromatic group in the aromatic backbone of the ion-conducting region is adjacent to an electron-donating group, such as an ether group (—O—) or thioether group (—S—), preferably an ether group. Ion-conducting functional groups such as sulphonic acid groups are readily introduced onto aromatic groups at positions ortho and para to electron-donating groups.

Phenylene groups in the aromatic backbone are suitably attached to connecting groups or to other aromatic groups in a 1,4; 1,3 or 1,2 linkage, preferably a 1,4 linkage. Napthylene groups in the aromatic backbone are suitably attached to connecting groups or other aromatic groups in a 2,6; 2,7; 1,5 or 1,4 linkage. Preferred aromatic backbones for the ion-conducting region are:

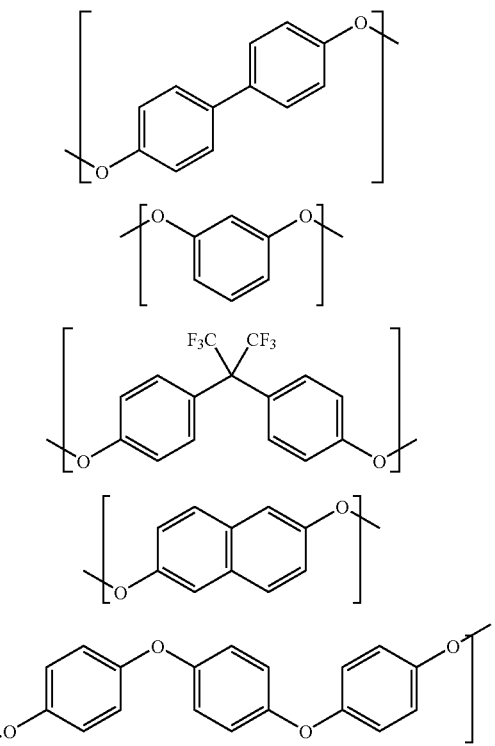

The ion-conducting functional groups are suitably sulphonic acid or phosphonic acid groups, preferably sulphonic acid groups. Suitably the ion-conducting functional group is in an ortho position with respect to any electron donating groups adjacent to the aromatic group. Suitably one or two ion-conducting functional groups are attached to each aromatic group. Preferred ion-conducting regions are:

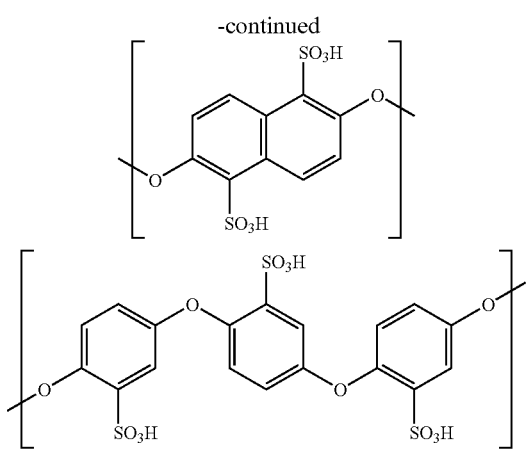

The aromatic backbone of the non-ionic spacer region contains at least four aromatic groups, suitably contains at least six aromatic groups and preferably contains at least seven aromatic groups. The ratio of the number of aromatic groups in the spacer region to the number of aromatic groups in the ion-conducting region is suitably at least 2:1, preferably at least 3:1. This ratio affects the equivalent weight of the polymer. The aromatic groups may be phenylene, napthylene or anthracenylene groups, but are preferably phenylene groups. The aromatic groups are suitably connected by electron-withdrawing groups such as sulphone or ketone groups or may be directly attached to other aromatic groups. Suitably, the aromatic groups are not connected to electron-donating groups such as ether groups. Alternatively, if the aromatic groups are connected to an electron-donating group, they are also connected to an electron-withdrawing group.

In a preferred embodiment, the aromatic groups in the ion-conducting region are connected to electron-donating groups, and the aromatic groups in the spacer region are either not connected to electron-donating groups or are connected to electron-withdrawing groups and electron-donating groups. The polymer can be produced by introducing ion-conducting groups onto a polymer chain, e.g. by sulphonation, and the ion-conducting groups will be introduced onto the aromatic groups that are activated by electron donation, i.e. the groups in the ion-conducting region, and will not be introduced onto the unactivated aromatic groups, i.e. the groups in the spacer region.

Phenylene groups in the aromatic backbone of the non-ionic spacer region are suitably attached to connecting groups or to other aromatic groups in a 1,4; 1,3 or 1,2 linkage, preferably a 1,4 linkage. Napthylene groups in the aromatic backbone are suitably attached to connecting groups or other aromatic groups in a 2,6; 2,7; 1,5 or 1,4 linkage. Preferred aromatic backbones for the spacer region are:

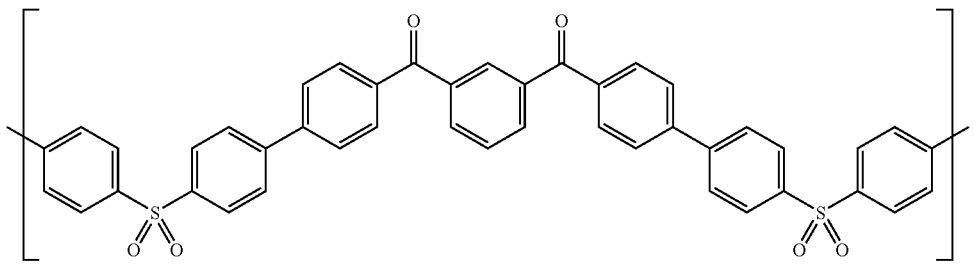

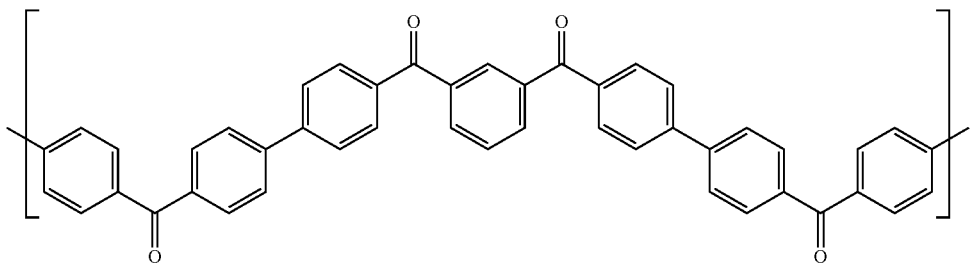

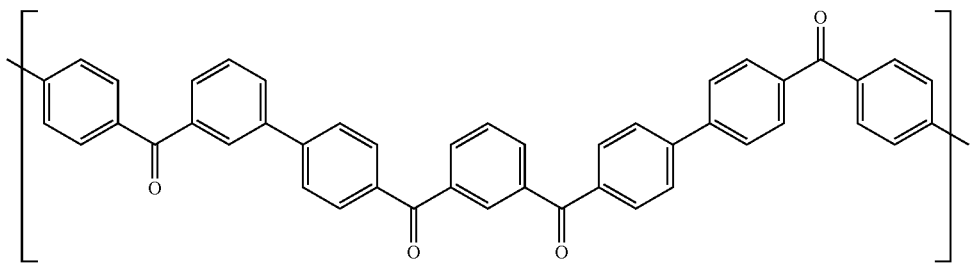

-continued
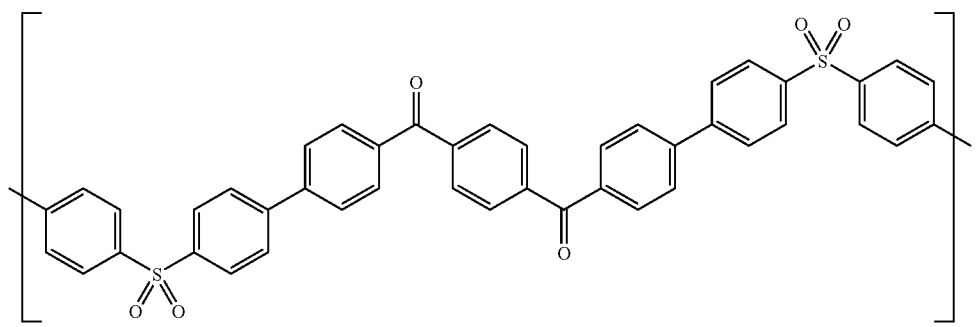
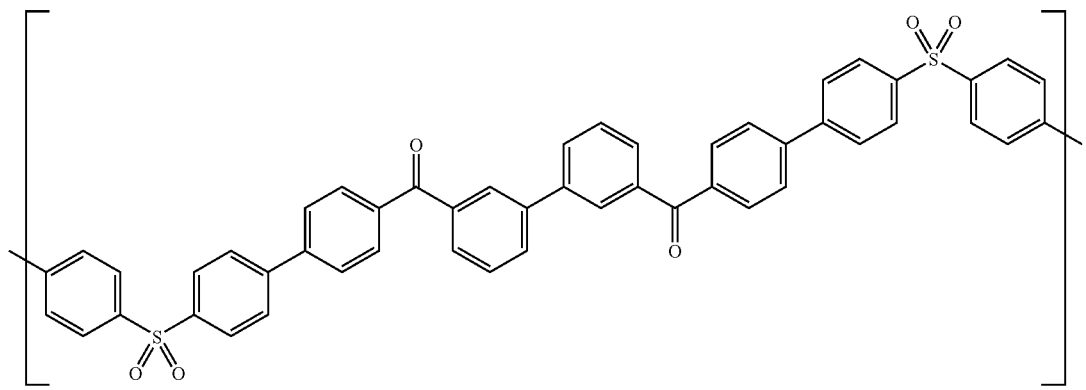
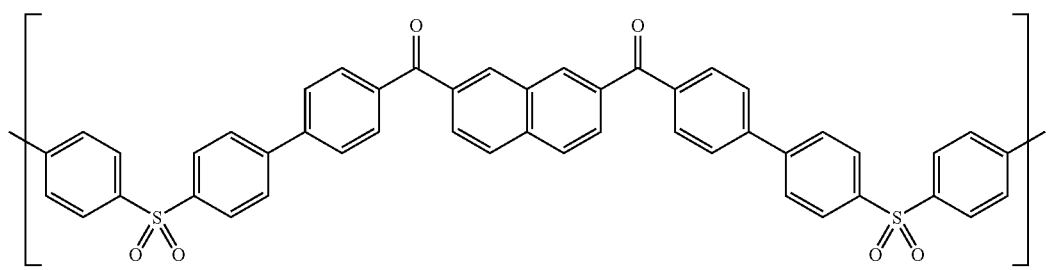
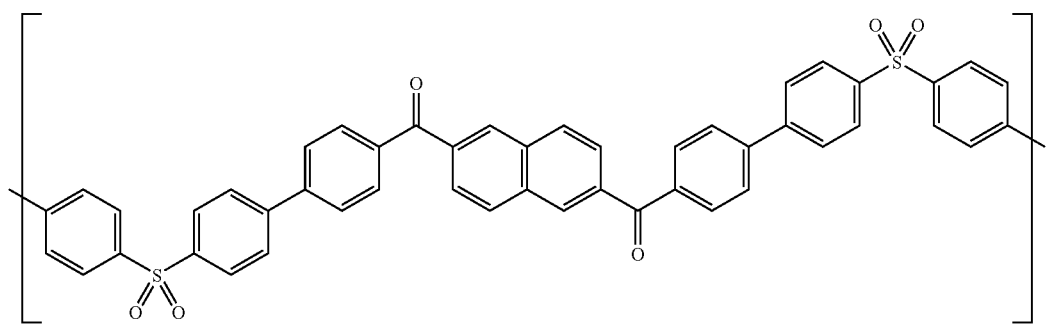

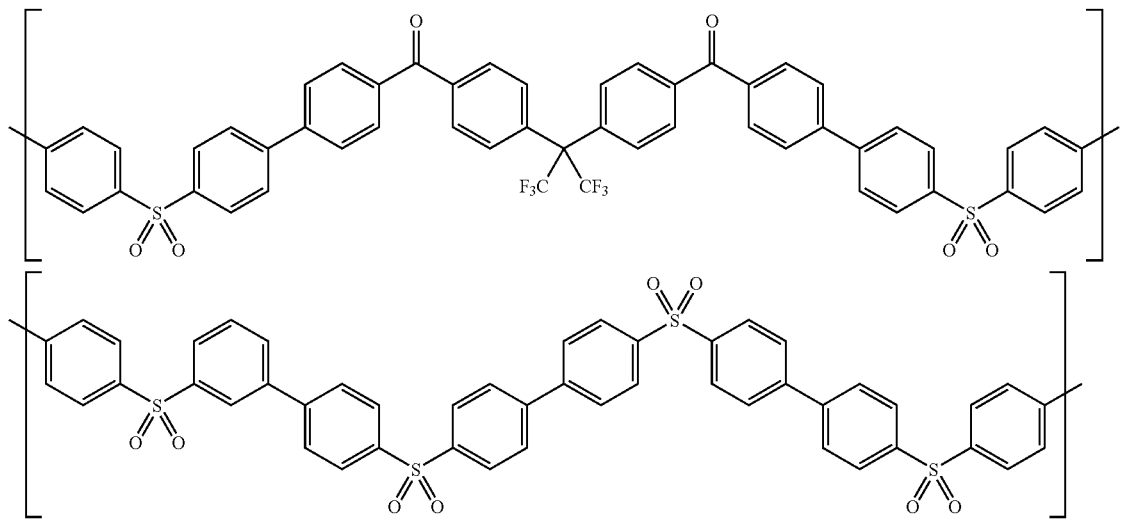

The aromatic groups in the spacer region may contain non-ion conducting substituents, but preferably do not contain any substituents.

Suitably, the polymer according to the invention has an equivalent weight of less than 1000 g mol$^{-1}$, preferably less than 800 g mol$^{-1}$. The equivalent weight is defined as the weight of the polymer in acid form (in grams) required to neutralise one mole of NaOH. The conductivity of the polymer is usually proportional to the concentration of active ionic species, so a low EW polymer has high conductivity.

The inherent viscosity of the polymer is suitably greater than 0.5 dL g$^{-1}$ and preferably greater than 1.0 dL g$^{-1}$. If the polymer has an inherent viscosity of greater than 1.0 dL g$^{-1}$ it is likely to have good film-forming characteristics and be suitable for forming a polymer membrane. Additionally it is likely to have good mechanical strength and it should be resistant to mechanical degradation.

The polymer is suitably made by a process wherein the first step is the condensation polymerisation of two monomers, wherein the first monomer has an aromatic backbone with terminal hydroxyl groups, and the second monomer has an aromatic backbone with terminal chloro or fluoro groups. For example:

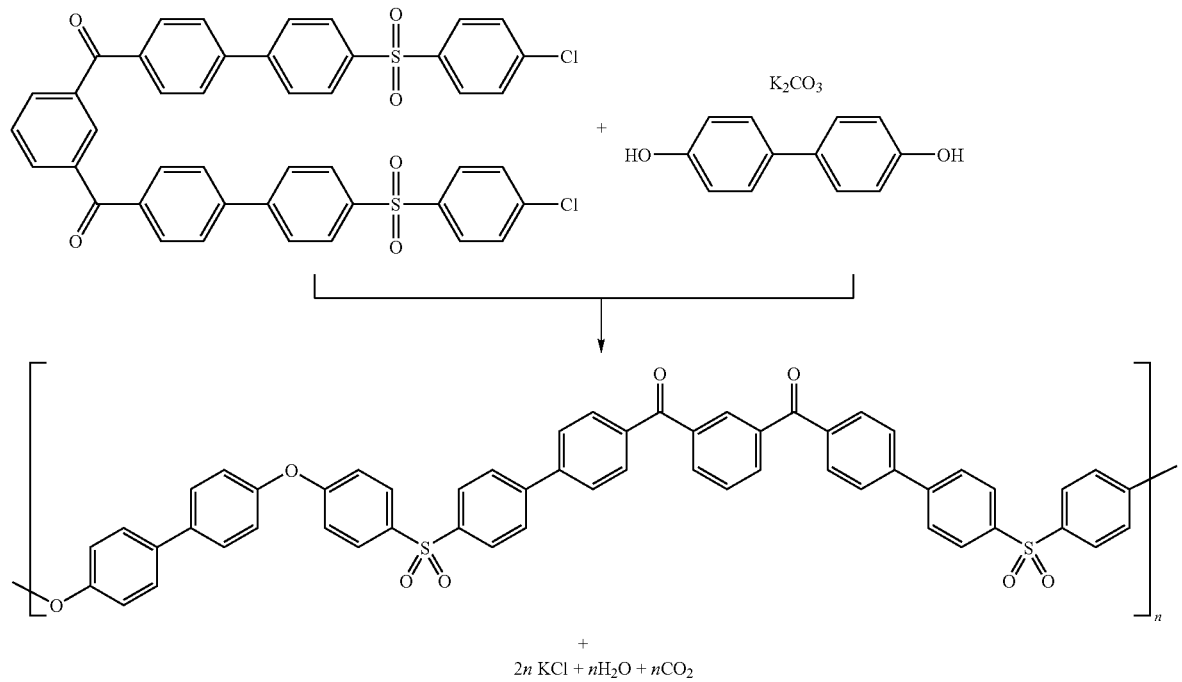

The polymerisation reaction is suitably carried out in a solvent such as diphenylsulphone at a temperature of at least 220° C.

A polymer according to the invention is provided by introducing ion-conducting groups into the polymer, e.g. by sulphonation:

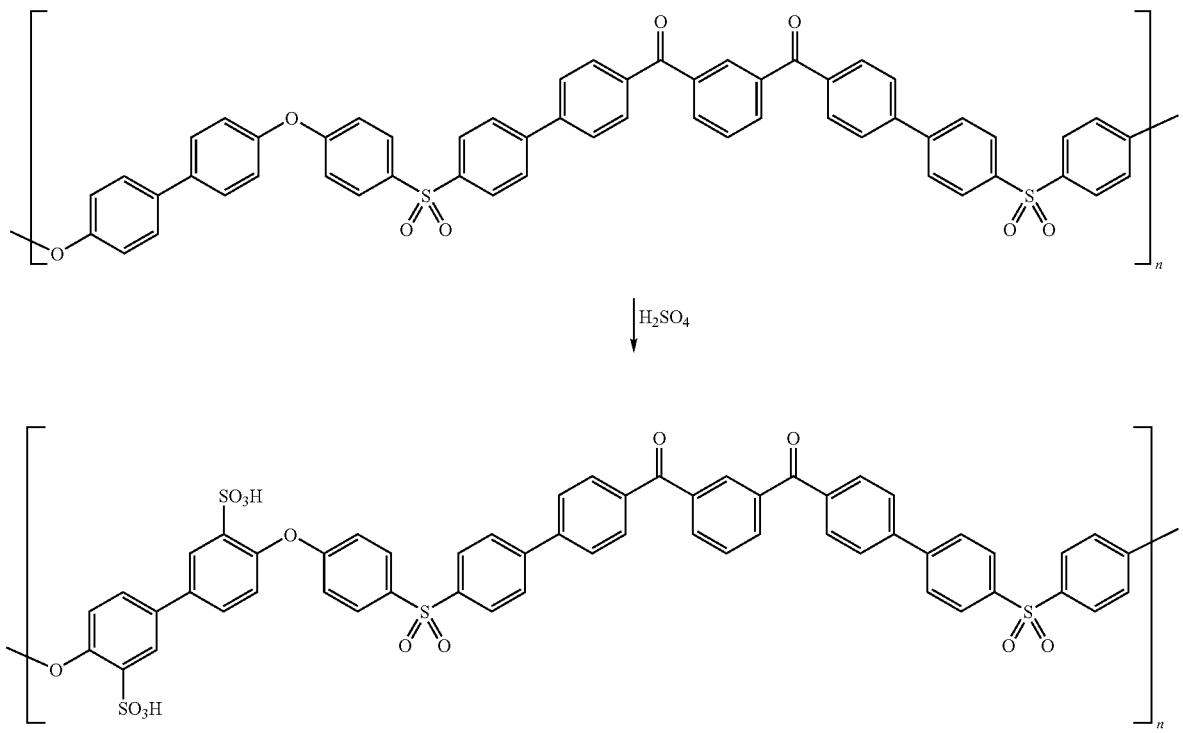

In this example, the polymer is treated with concentrated sulphuric acid, and sulphonic acid groups are introduced onto the aromatic groups that are adjacent to the electron-donating ether groups.

The monomers for the condensation polymerisation are either readily available or can be produced by methods that are well-known to the skilled person. For example, monomers having terminal chloro groups can be produced by Friedel-Crafts reactions:

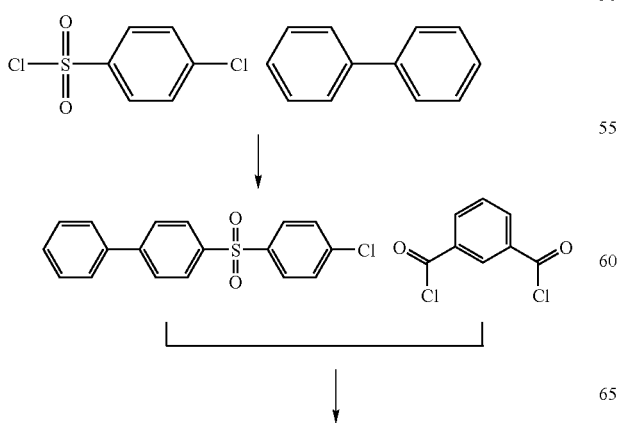

-continued

The polymer may also be made by introducing sulphonic acid groups into a monomer before condensation polymerisation, e.g. polymerisation of the monomers shown below could provide a polymer according to the invention:

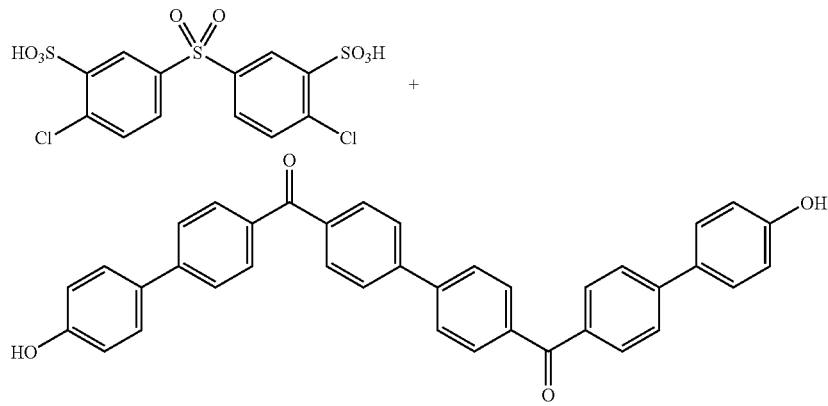

The present invention further provides a polymer solution comprising a polymer according to the invention. The polymer solution may be prepared by dissolving the polymer in a polar solvent such as N-methylpyrrolidone (NMP), dimethylformamide (DMF) or dimethylacetamide (DMAc).

The present invention yet further provides a polymer electrolyte membrane comprising a polymer according to the invention. The membrane may be cast from a polymer solution, which typically has a concentration of 5-20% w/v. Casting with, e.g. a Gardner knife, provides a thin film of solution (approx 100-1000 μm). The solvent can be evaporated at high temperatures, optionally under vacuum. Suitably the thin film is soaked in water to replace any residual solvent. Membranes may also be prepared by depositing polymer solution onto a support material, such as an expanded PTFE membrane.

The polymer solutions according to the invention may also be used to incorporate ion-conducting polymer into an electrocatalyst layer for use in a fuel cell. Therefore, the present invention further provides an electrocatalyst layer on a substrate wherein the electrocatalyst layer comprises a polymer according to the invention. The term "electrocatalyst" will be well understood by a person skilled in the art to mean a catalyst that can facilitate an electrochemical reaction.

The present invention yet further provides a membrane electrode assembly (MEA) comprising a polymer electrolyte membrane and/or an electrocatalyst layer according to the invention. The MEA can be used in a hydrogen fuel cell or in a direct methanol fuel cell.

Although the use of the polymers of the invention as fuel cell membranes has been described in detail, it is envisaged that the polymers will have other uses, e.g. in filtration or ion-exchange processes. The invention will now be described by reference to examples which are not intended to be limiting of the invention:

EXAMPLE 1

Synthesis of Monomer A

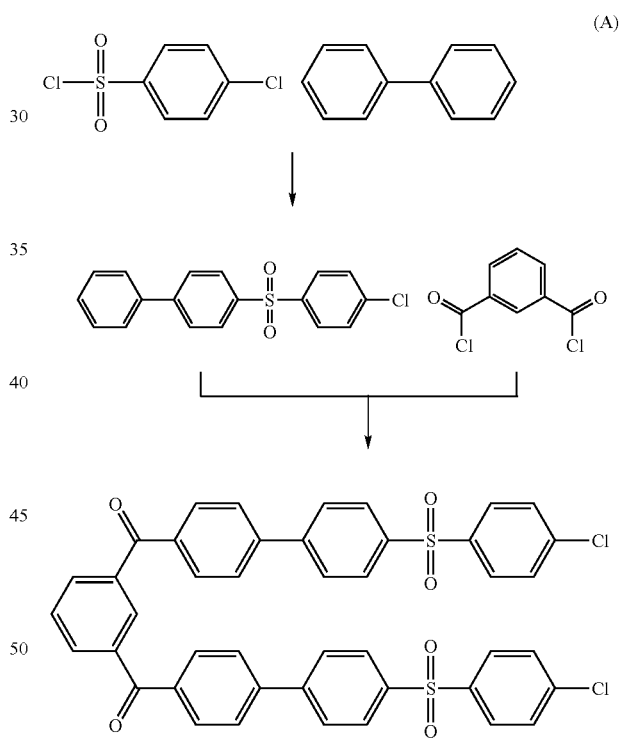

A mixture of biphenyl (10 g, 0.065 mol) and 4-chlorobenzenesulphonyl chloride (13.69 g, 0.065 mol) in trichlorobenzene (3 mL) was heated with stirring to 110° C. Anhydrous ferric chloride (0.05 g, 0.0003 mmol) was added and stirring was continued at 150° C. for 16 h. The cooled solid was stirred with methanol (200 mL). The product was filtered, washed with methanol, dried, and recrystallised from acetic acid to give 4-(4'-chlorobenzenesulphonyl)biphenyl (13.9 g, 65%); m.p. 169° C. (lit. 171-173° C.).

Isophthaloyl dichloride (4.0 g, 0.0197 mol), 4-(4'-chlorobenzenesulphonyl)-biphenyl (14.24 g, 0.043 mol), and aluminium chloride (13.08 g, 0.098 mol) were heated with stirring in trichlorobenzene (35 mL) at 150° C. for 3 h, until HCl evolution virtually ceased. After cooling the viscous solution was poured into a mixture of water and concentrated HCl (250 mL/20 mL). The aqueous phase was separated and the yellow viscous product was treated with hexane (50 mL) and then stirred in methanol (50 mL). The white-yellow powder was dried under vacuum overnight and then recrystallized twice from DMF (100 mL) to give monomer A (6.0 g, 42% yield) as a white powder.

The monomer A had m.p. 284° C., m/z MALDI-TOF-MS [100% (M+H)$^+$] 786.36, Calc. for $C_{44}H_{28}S_2O_6Cl_2$, 787.71; $^1$H NMR (CDCl$_3$/CF$_3$COOH, 5/1) δ (ppm) 7.57 (AA'BB' system, 4H), 7.75-7.85 (m, 9H), 7.93-7.99 (m, 8H), 8.07 (AA'BB' system, 4H), 8.14 and 8.17 (dd, 2H), 8.28 (br, s, 1H); $^{13}$C (CDCl$_3$/CF$_3$COOH 5/1) δ (ppm) 128.24, 128.65, 129.04, 129.37, 130.49, 131.92, 135, 135.4, 136.07, 137.45, 139.95, 141.63, 144.9, 145.72.

Polymerisation to the reactor, together with 35 g of diphenylsulphone (DPS). The reactor was then purged with dry nitrogen for 20 minutes before heating. The temperature control program started at 220° C. and the reaction mixture was held at this temperature until DPS had fully melted, at which point the mechanical stirrer was started. The temperature was then raised to 290° C. over 2 hours, where it was held for a further 3 hours. The viscous solution was then poured onto an aluminium sheet and, once cooled, the solid product was broken up and extracted twice with boiling methanol before being milled to a fine powder. It was then extracted twice more with boiling methanol, once with hot (60° C.) de-ionised water to remove residual salts, and finally again with methanol. The resulting powder was vacuum dried at 110° C. to give 4.97 g (87% yield) of pale cream polymer, with inherent viscosity (I.V.) 1.36 dlg$^{-1}$, and glass transition temperature (T$_g$) 247° C.

Sulphonation

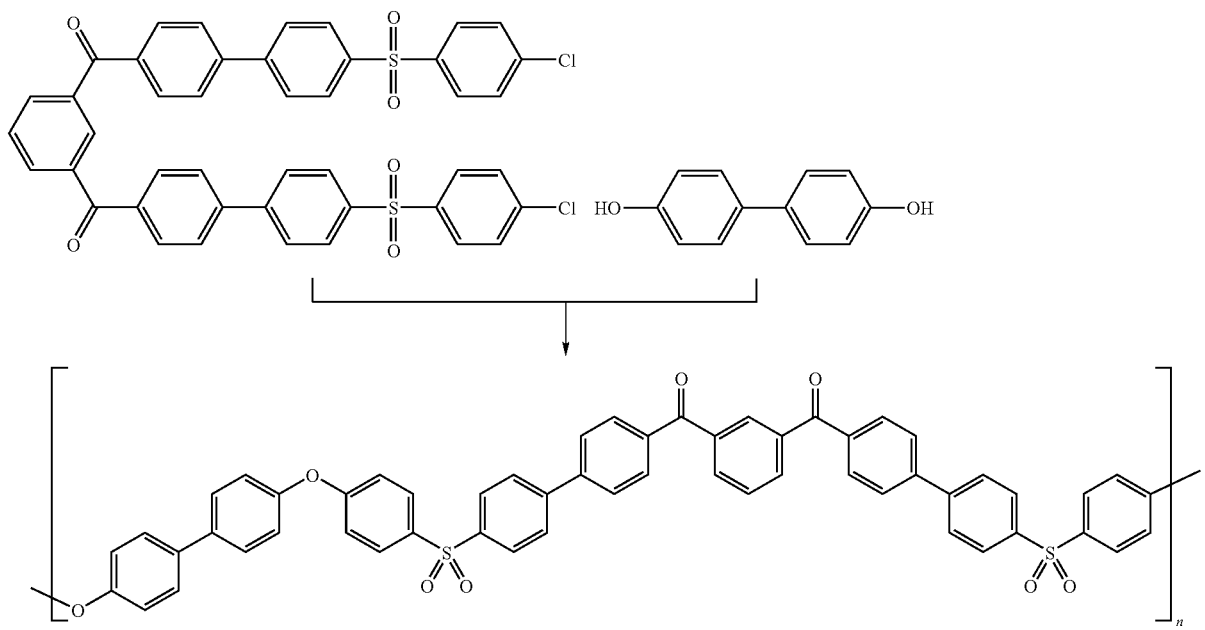

Monomer A (5.00 g, 0.0064 mol), 4,4'-biphenol (1.18 g, 0.0064 mol) and K$_2$CO$_3$ (0.922 g, 0.0067 mol) were weighed

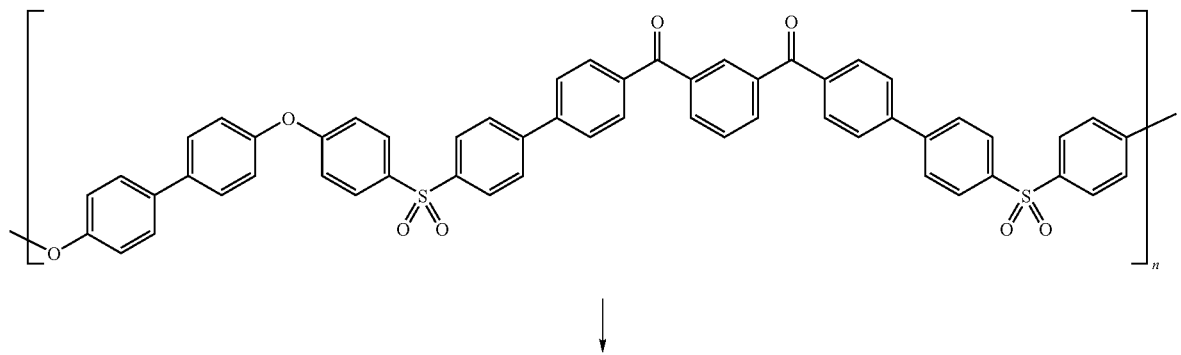

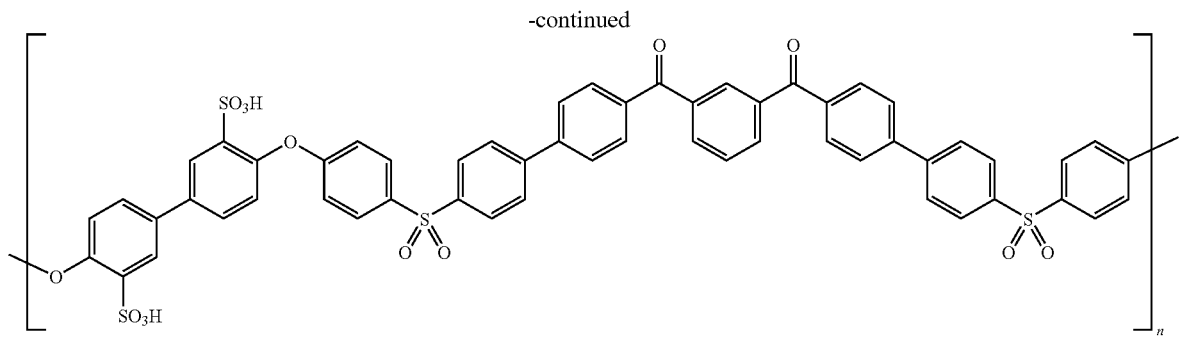

Polymer (5 g) was added over about 5 minutes, with stirring, to 70 mL of 98% sulphuric acid (A.R. grade) in a 500 mL 3-neck round-bottomed flask, fitted with a mechanical stirrer and PTFE paddle. After stirring for a further 20 minutes at room temperature the flask was heated in an oil bath to 60° C. and stirred for 16 h. The resulting clear, viscous pale yellow solution was cooled and added slowly to stirring deionised water, via a PTFE colander (1 mm hole size), maintaining a depth of about 1 cm of polymer solution in the colander. This resulted in controlled formation of uniform polymer beads on coagulation in water. When coagulation was complete, the beads were filtered off on a coarse glass sinter, stirred in deionised water (1 L) for 30 minutes at room temperature, and then refiltered. This process was repeated several times until the conductivity of the washings was less than 10 μs. The resulting beads were then dried in a stream of air at 75° C., and finally under vacuum at 75° C. to constant weight. The yield of ion-conducting polymer was 4.8 g; I.V.=2.54 dl g$^{-1}$.

EXAMPLE 2

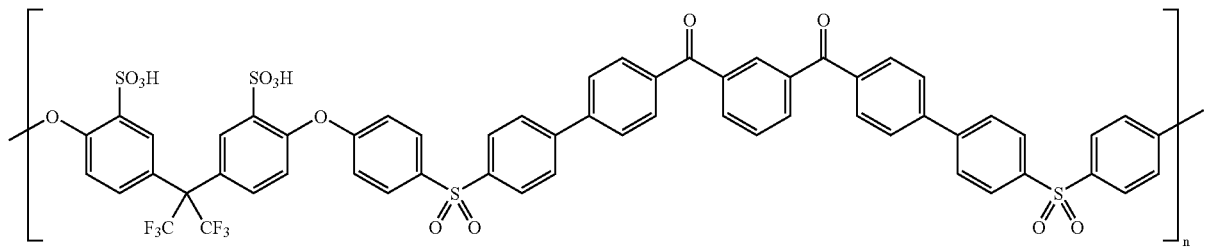

Example 1 was repeated except that 4,4-(hexafluoroisopropylidene)diphenol (2.135 g, 0.0064 mol) was used instead of the 4,4'-biphenol in the polymerisation step. The yield from the polymerisation step was 6.4 g (90%); I.V. 0.57 dl g$^{-1}$, T$_g$=230° C. The yield from the sulphonation was 6.5 g with I.V.=1.5 dl g$^{-1}$.

EXAMPLE 3

Synthesis of Monomer B

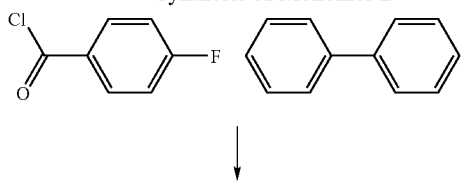

(B)

-continued

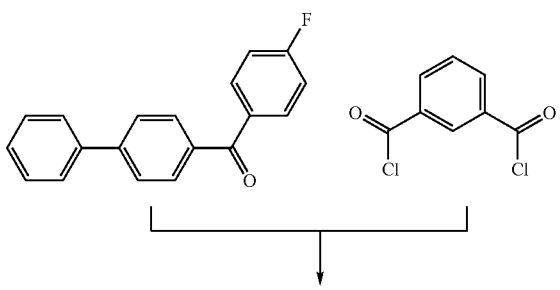

To a stirred solution of biphenyl (96.02 g, 0.632 mol) in trichlorobenzene (640 mL) was added aluminium chloride (91 g, 0.174 mol) in two portions. 4-Fluorobenzoyl chloride (70 mL, 0.593 mol) was then added dropwise from a dropping funnel over 1 h to the solution at 40° C., and the temperature was then raised to 100° C. for 6 h until HCl ceased to evolve. The mixture was allowed to cool to room temperature and poured into an ice/HCl mixture (ca. 2 L), and left stirring overnight. The water was decanted and the white sludge was stirred vigorously with methanol. The crude product was recovered by filtration, washed with methanol, and then dried under vacuum at 80° C. overnight This product (110 g) was recrystallised twice from toluene to give white crystals of 4-(4'-fluorobenzoyl)biphenyl (77 g, 47%); m.p. 149° C. (lit. 148.5-149° C.).

Isophthaloyl dichloride (10.152 g, 0.05 mol), 4-(4-fluorobenzoyl)biphenyl (29.01 g, 0.105 mol) and aluminum chloride (33.25 g, 0.249 mol) were heated with stirring in trichlorobenzene (150 ml) at 140° C. for 6 h until HCl ceased to evolve. The mixture was then poured into an ice/HCl mixture (2 L) and stirred overnight, then heated to 70° C. and the water/HCl decanted. The slurry was then vigorously stirred with methanol and the product filtered off, washed twice with methanol and twice with acetone and dried at 80° C. under vacuum, to give a crude product (29 g). This was recrystalised once from NMP and then once from dichloroacetic acid to give monomer B (14 g, 41%) as an off-white crystalline powder.

Monomer B had m.p. 310° C., $^1$H NMR (CDCl$_3$/CF$_3$CO$_2$H 4/1) δ (ppm) 7.22-7.30 (dd, 4H), 7.80-7.99 (m, 17H) 8.02-8.05 (d, 4H), 8.19-8.23 (dd, 2H), 8.34 (br, s, 1H). $^{13}$C NMR δ (ppm) 116.3, 116.6, 128.0, 128.2, 129.7, 131.8, 132.0, 132.3, 132.8, 134.0, 134.2, 135.6, 135.7, 136.5, 137.5, 145.2, 145.9, 164.9, 169.0, 200.1 (CO), 200.3 (CO).

Polymerisation

Monomer B (5 g, 0.00732 mol), 4,4-biphenol (1.364 g, 0.00732 mol) and potassium carbonate(1.063 g, 0.00769 mol) were weighed to the reactor, together with 36 g of diphenyl sulphone (DPS). The polymerisation procedure was similar to that described in Example 1 except that polymerisation temperature was 350° C. for 4 h. The polymer (6 g, 98%) had IV=1.7 dl g$^{-1}$ and m.p. 422° C.

Sulphonation

Polymer (5 g) was sulphonated using the same procedure as described in Example 1, obtaining an ionomer (4 g) with IV=3.1dl/g.

EXAMPLE 4

Synthesis of Monomer C

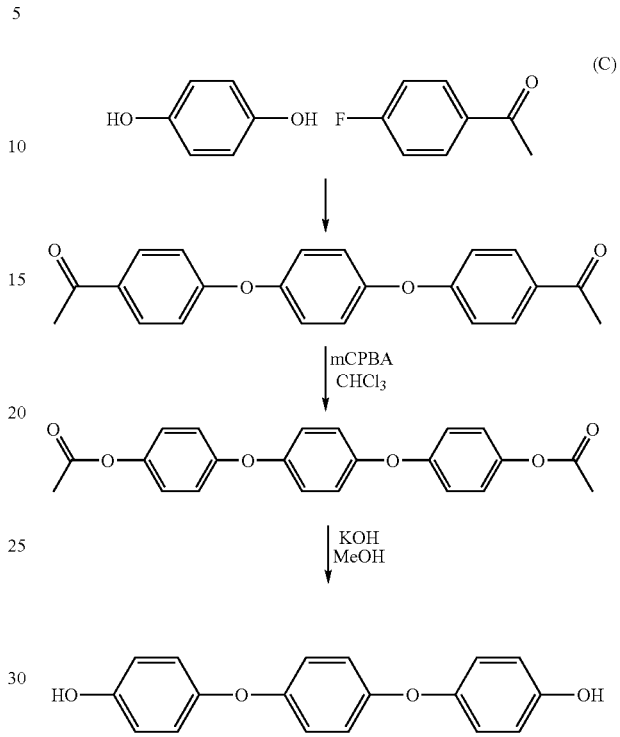

1,4-Bis(4'-acetylphenoxy)benzene was synthesized according to a literature method (G. W. Yeager and D. N. Schissel, *Synthesis;* 1991; 1, 63) in 30% yield. Reaction with mCPBA and chloroform gave a diester in 70% yield. Monomer C was obtained in 72% yield by hydrolysis of the diester.

Polymerisation

Monomer B (5 g, 7.32 mmol), monomer C (2.156 g, 7.32 mmol), K$_2$CO$_3$ (1.06 g, 7.69 mmol) and diphenyl sulfone (40.52 g) were heated at 190° C. for 0.5 h. The temperature was gradually increased to 280° C. over 2 h and held at this temperature for 2 h, finally reaching 310° C. over 1.75 h and kept at this temperature for 1 h. The polymer had IV=0.82 dL/g and m.p.=315° C. and 337° C. (double peak).

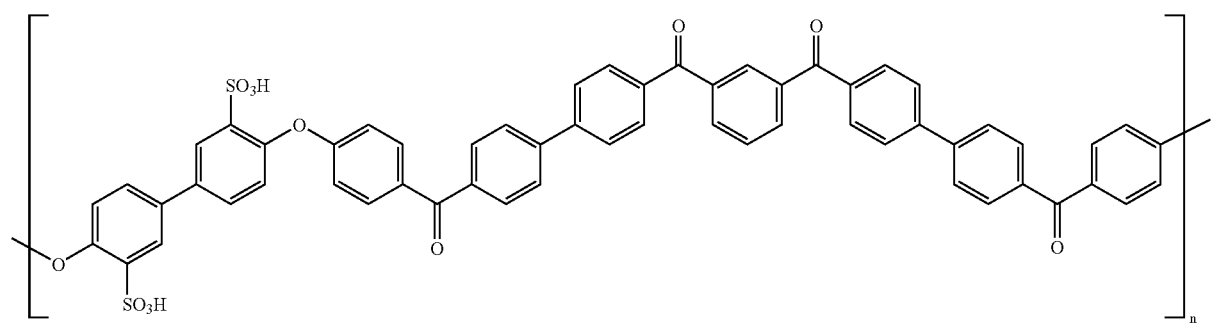

Sulphonation

The polymer was sulphonated using the same procedure as described in Example 1, obtaining an ionomer with IV=1.28 dL/g.

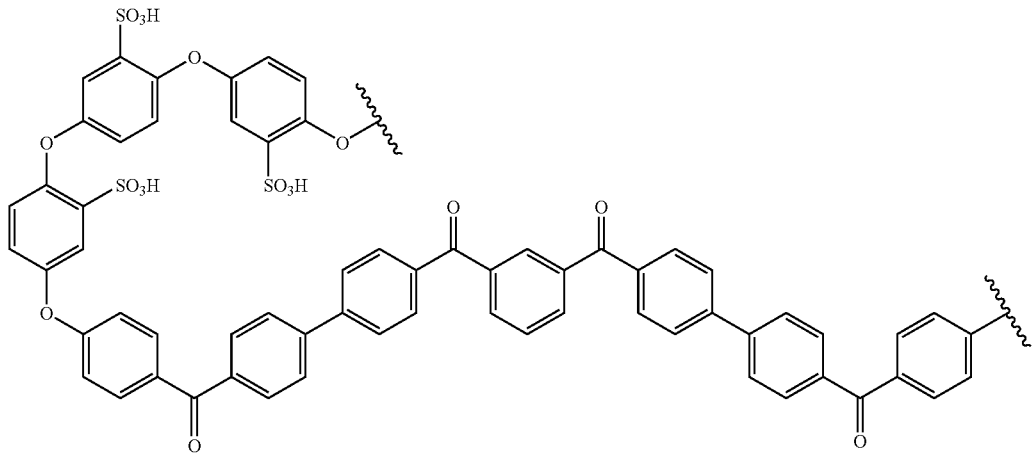

EXAMPLE 5

Synthesis of Monomer D

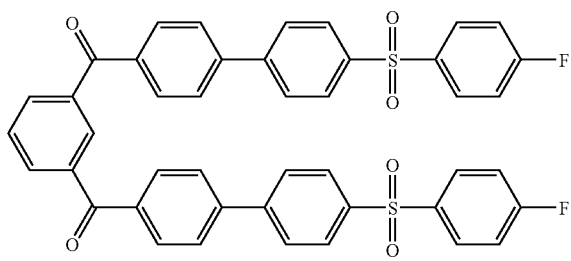

A fluoro analogue of Monomer A was made by the same method as outlined for the synthesis of Monomer A except that 4-chlorobenzenesulphonyl fluoride was used instead of 4-chlorobenzenesulphonyl chloride.

Polymerisation

Monomer D (5 g, 6.35 mmol), monomer C (1.868 g, 6.35 mmol), $K_2CO_3$ (0.922 g, 6.67 mmol) and diphenyl sulfone (38.9 g) were heated from 190° C. to 290° C. for over 3.5 h. The temperature was held at 290° C. for 3 h. The polymer had IV=0.55 dL/g.

Phosphonation

The polymer was sulphonated using the same procedure as described in Example 1, obtaining an ionomer with IV=1.00 dL/g.

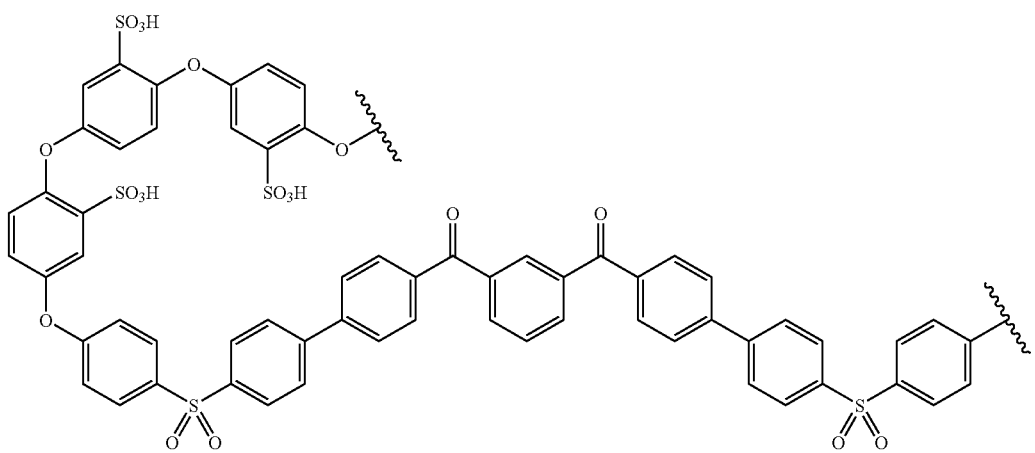

EXAMPLE 6

Synthesis of Monomer E

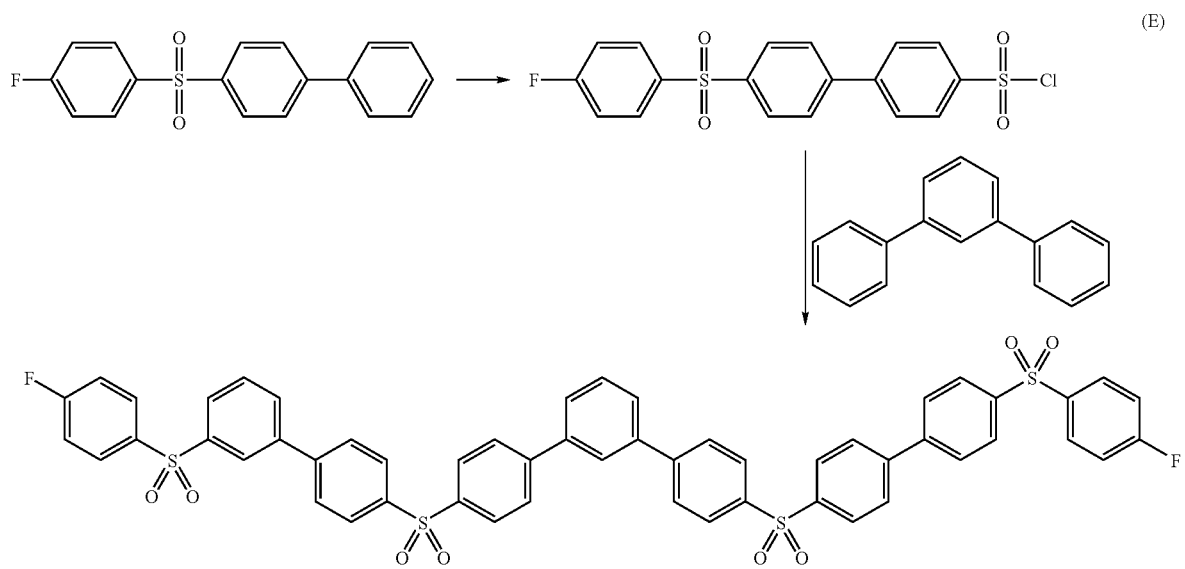

4-Fluorobenzenesulfonylbiphenyl (40 g, 128 mmol) was dissolved in CHCl$_3$ (300 mL) and cooled to 0° C. Chlorosulfonic acid (74.6 g, 640 mmol) was added dropwise to the above solution. HCl was evolved immediately. The reaction was kept at 0° C. until evolution of HCl ceased, and then at room temperature for further 2 h. The mixture was poured into water, and the organic layer was washed with water followed by evaporation of the solvent, affording the sulfonyl chloride (30 g, 55% yield).

A mixture of the sulfonyl chloride (37.63 g, 89 mmol), m-terphenyl (10 g, 43.4 mmol) and ferric chloride (0.3 g) in nitrobenzene (125 mL) was reacted under nitrogen at 150° C. overnight, cooled and the product precipitated by addition of methanol. The crude product was recrystallised from DMF to afford the difluoro monomer E (11.4 g, 27% yield), m.p.=309° C., MS (MALDI-TOF)=978.7.

Polymerisation

Monomer E (4 g, 4.09 mmol), monomer C (1.2 g, 4.09 mmol), K$_2$CO$_3$ (0.59 g, 4.29 mmol) and diphenyl sulfone (36.1 g) were heated from 190° C. to 290° C. for over 3.5 h. The temperature was held at 290° C. for 3 h. The polymer had IV 0.61 dL/g and a T$_g$ of 147° C.

Sulphonation

The polymer was sulphonated using the same procedure as described in Example 1, obtaining an ionomer with IV=1.50 dL/g. Sulphonation occurred on the three aromatic groups adjacent to ether groups, but also occurred on an aromatic group which is not adjacent to an-electron-donating group. This polymer can be viewed as having two repeat units: in the first repeat unit the ion-conducting region contains three aromatic groups and the spacer region contains four aromatic groups; in the second repeat unit the ion-conducting region contains one aromatic group and the spacer region contains four aromatic groups.

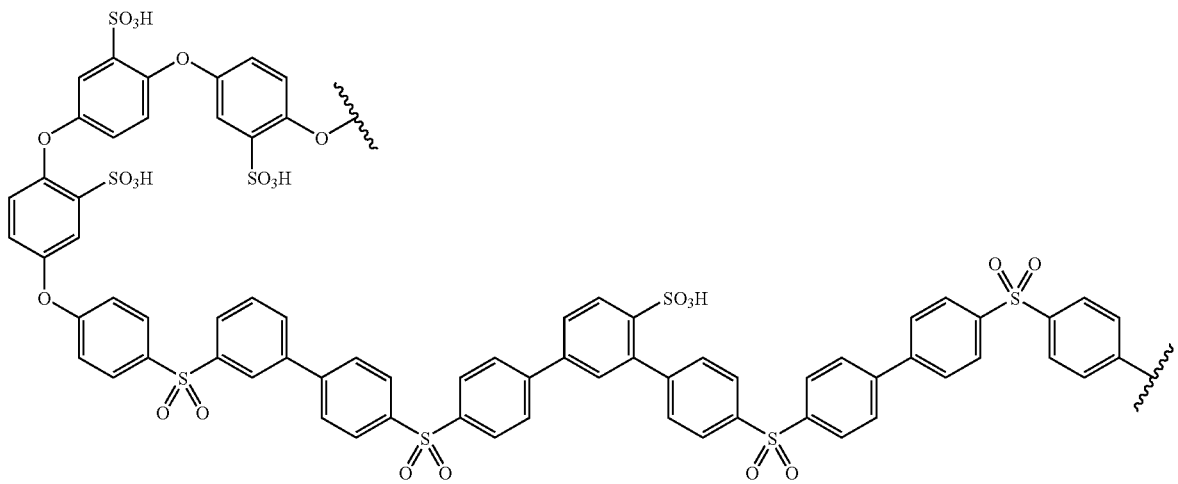

Comparative Example 1

A random copolymer analogue of Example 1 was made from two different dihalide monomers and two bis-phenols:

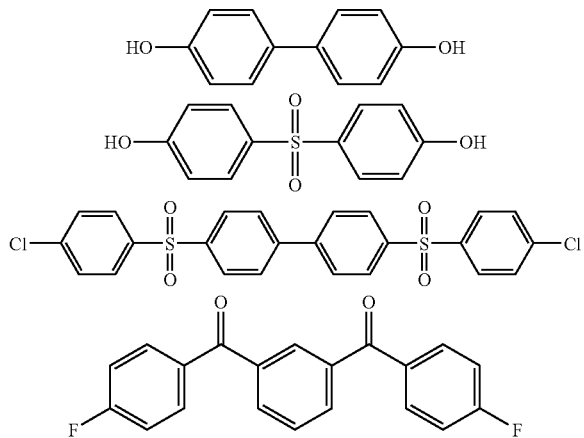

The monomers were made by conventional Friedel-Crafts reactions. A mixture of 4,4'-biphenol (1.117 g, 0.006 mol), 4,4'-dihydroxydiphenylsulphone (0.901 g, 0.0036 mol), 4,4'-bis(4-chlorobenzenesulphonyl)biphenyl (3.021 g, 0.006 mol) and 1,3-bis(4-fluorobenzoyl)benzene (1.16 g, 0.0036 mol) was polymerised using the procedure described in Example 1. The yield from the polymerisation step was 5.4 g (96%); I.V.=1.16 dl g$^{-1}$, Tg=234° C. The polymer (5.18 g) was sulphonated as described in Example 1 to give an ionomer (5.58 g, 92%) with I.V.=1.86 dl g$^{-1}$.

In comparison to the polymers of examples 1 to 3, the polymer prepared in comparative example 1 is a statistical copolymer and does not contain repeat units that comprise both ion conducting and spacer regions. The ion-conducting and non-ion conducting regions in the polymer of comparative example 1 are randomly located along the length of the chain.

Comparative Example 2

A known sulphonated polyarylethersulphone polymer was produced using a polycondensation route as described in U.S. Pat. No. 5,693,740:

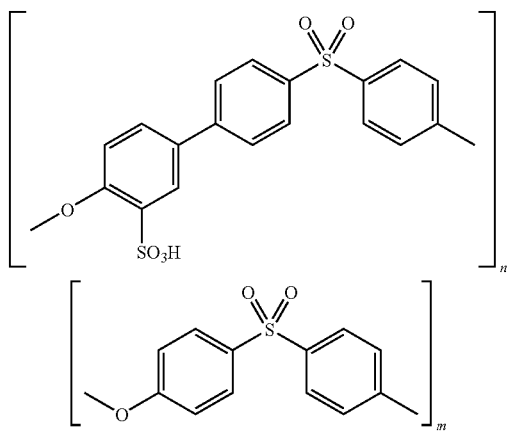

The ratio of m:n was m=0.5 n. The distribution of the two repeat units in the polymer is statistical and, unlike the polymers of the invention, the polymer does not contain repeat units containing both an ion-conducting region and a spacer region having an aromatic backbone of at least four aromatic groups.

Membrane Production

Polymers made according to Examples 1-6 and comparative examples 1-2 were made into membranes. Beads of the polymer in the acid form (4 g) were added to N-methylpyrrolidone (NMP) (22.67 g), and stirred under dry nitrogen until a clear viscous solution was obtained. The solution was filtered through a 5 μm pore-size PTFE microfiltration membrane (Sartorius, 47 mm diameter), using a Sartorius pressure-filter cell (SM 16249) under compressed air.

A plate-glass sheet (20×25 cm) was cleaned rigorously with a fine abrasive cream, rinsed copiously with deionised water, and then with acetone, and allowed to dry in air. The casting dope was spread evenly along the full width of a Gardner Knife (set at a height of 300 μm above the glass surface) out to a distance of about 6 cm from the blade. The knife was then drawn to give a uniform film of polymer solution which was dried at 50° C. to remove the majority of the solvent, and then at 105° C. under vacuum to constant weight.

The resulting polymer film could be easily removed from the plate after equilibrating with atmospheric water vapour for several hours. The membrane thickness (ca. 40 μm) was measured at six points and the values averaged.

Several other comparative membranes were used: a membrane made from a sulphonated PEEK (polyetheretherketone) polymer having 96% sulphonation (comparative example 3); a Flemion® SH-30 perfluorinated sulphonic acid membrane (comparative example 4), a Nafion® 117 perfluorinated sulphonic acid membrane of thickness 170 microns (comparative example 5), and a Nafion® 112 perfluorinated sulphonic acid membrane of thickness 50 microns (comparative example 6).

Polymer and Membrane Properties

Ion Exchange Capacity

The ion-exchange capacities of the polymers produced in examples 1-6 And comparative examples 1-2 were determined by stirring 6.5 g of as-made, wet polymer beads (i.e. after washing but before drying) with a solution of sodium hydroxide (5 g) in water (200 mL) at 65° C. for 2 h. The beads were filtered off, washed with deionised water, resuspended in deionised water (200 mL) for 30 minutes at 60° C. and then refiltered. The latter process was repeated five times, before the beads were finally dried to constant weight at 75° C. under vacuum. Elemental analysis for sodium then gave a direct measure of the ion-exchange capacity of the ionomer. Table 1 shows the measured ion-exchange capacities (in terms of equivalent weight) of the ionomers made and used in the examples:

|  | Equivalent weight (g mol$^{-1}$) |
| --- | --- |
| Example 1 | 529 |
| Example 2 | 606 |

-continued

| | Equivalent weight (g mol$^{-1}$) |
|---|---|
| Example 3 | 495 |
| Example 4 | 388 |
| Example 5 | 412 |
| Example 6 | 426 |
| Comparative Example 1 | 548 |
| Comparative Example 2 | 506 |
| Comparative Example 3 | 385 |

Water Uptake

Water-uptake of the membranes at room temperature was determined as follows: Two pieces of cast membrane (ca. 5×5 cm) were soaked in 1 M $H_2SO_4$ at room temperature for several hours and then rinsed several times with deionised water. The samples were dried at 110° C. under vacuum for at least 2 hours and weighed ($w_1$). The samples were then immersed in deionised water in vials and the vials placed in a water bath. The temperature was increased in steps (1 hour each step). Before increasing the temperature, the samples were removed from the water, blotted dry with filter paper, quickly weighed ($w_2$) and reimmersed. Water uptake, calculated as shown, was averaged for the two samples.

$$\text{water uptake} = \frac{w_2 - w_1}{w_1} \times 100\%$$

FIG. 1 shows the water uptake for membranes made from the polymers of example 1, example 3 and comparative example 1. The three polymers have similar EWs, but the statistical copolymer of comparative example 1 shows higher water uptake as temperature increases. As water uptake increases, the membrane swells and may begin to dissolve, and is therefore not suitable for use in a fuel cell.

The water uptake of a membrane made from the polymer of example 4 was compared with the water uptake of comparative membrane 3 (sulphonated PEEK). Despite very similar equivalent weights, the onset of excessive swelling that precedes dissolution occurred at very different temperatures for the two membranes. For the membrane made from the polymer of example 4, the swelling occurred at about 70° C. whereas for the comparative membrane 3, the swelling occurred at below 35° C.

Thermomechanical Analysis (TMA)

Thermomechanical analysis (TMA) was carried out with membrane samples to assess their mechanical stability at elevated temperatures. It was carried out using a 5 mm diameter hemispherical metal probe which was pressed into the surface of the membrane under a constant load of 79 g. The samples were heated from 20 to 180° C. at 10° C./minute. The membrane samples placed in the apparatus had been equilibrated at room temperature and ambient relative humidity. The distance the tip travels into the membrane was recorded as a function of temperature.

Figure 2:
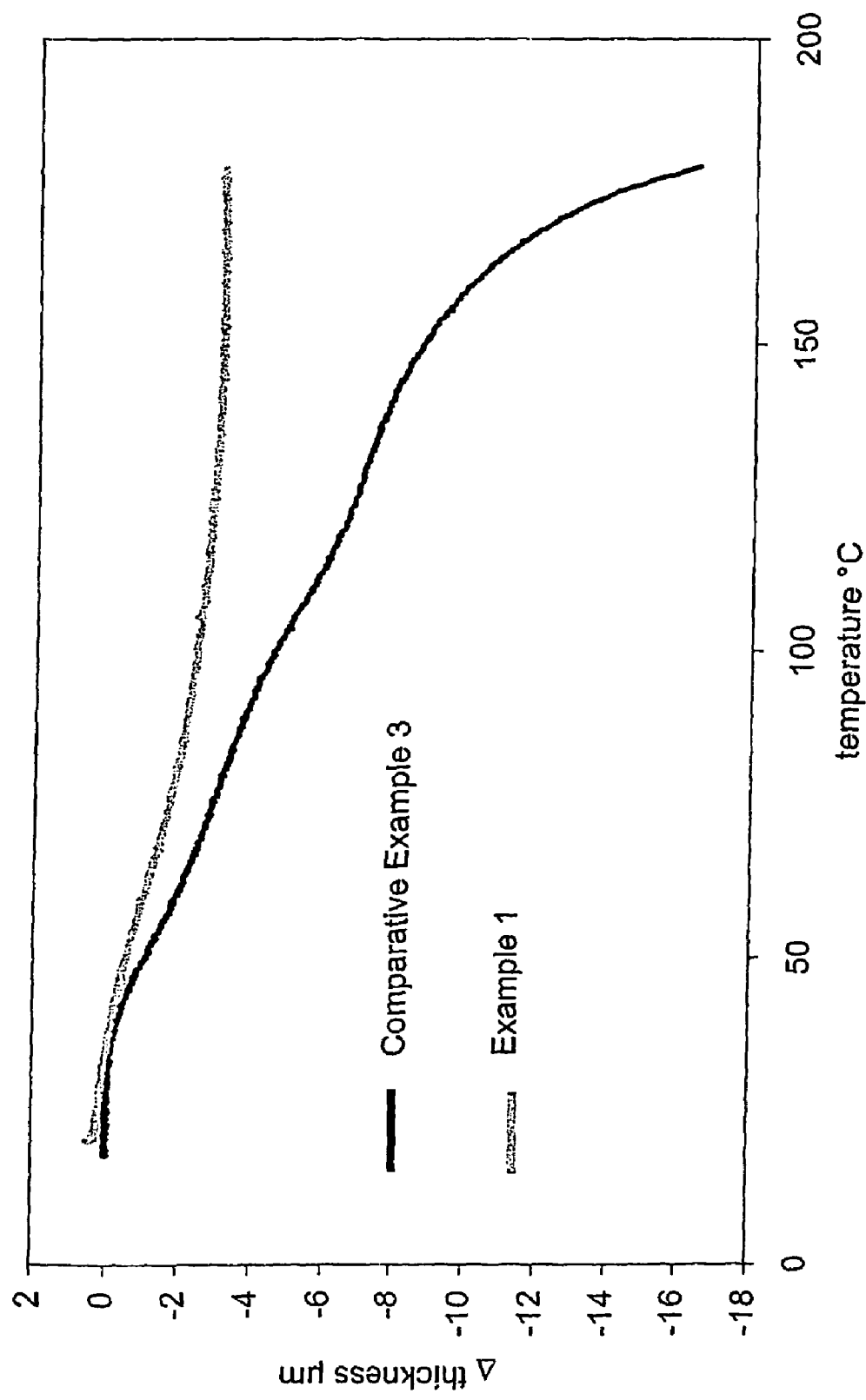
FIG. 2 is a graphical representation of thermochemical analysis (TMA) for membranes based on data from example 1 and comparative example 3.

FIG. 2 shows TMA data for a membrane made from the polymer of Example 1 and for comparative membrane 4 (Flemion® SH-30). At elevated temperatures the Flemion® membrane shows significant samples thinning as a consequence of softening, whereas the membrane according to the invention is relatively unaffected by the increasing temperature. This is especially the case in the temperature range 30-150° C. where fuel cells usually operate.

Hydrogen Permeability Data

The hydrogen permeability of the membranes was measured using membrane electrode assemblies (MEAs) at temperatures in the range of 30-100° C. under fully humidified conditions (100% relative humidity). The MEAs were made by sandwiching the membranes between two porous platinum black electrodes with Toray TGP-H-60 porous carbon fibre paper current collectors. Pure hydrogen gas was passed over side A of the MEA and pure nitrogen gas was passed over side B of MEA using two graphite current collecting plates with machined gas distribution channels. The hydrogen that diffused through the membrane from side A to side B was consumed electrochemically to produce an electrical current by means of a potentiostat. The magnitude of the current, at several gas pressures was used to calculate the hydrogen diffusion rates across the membranes.

Figure 3:
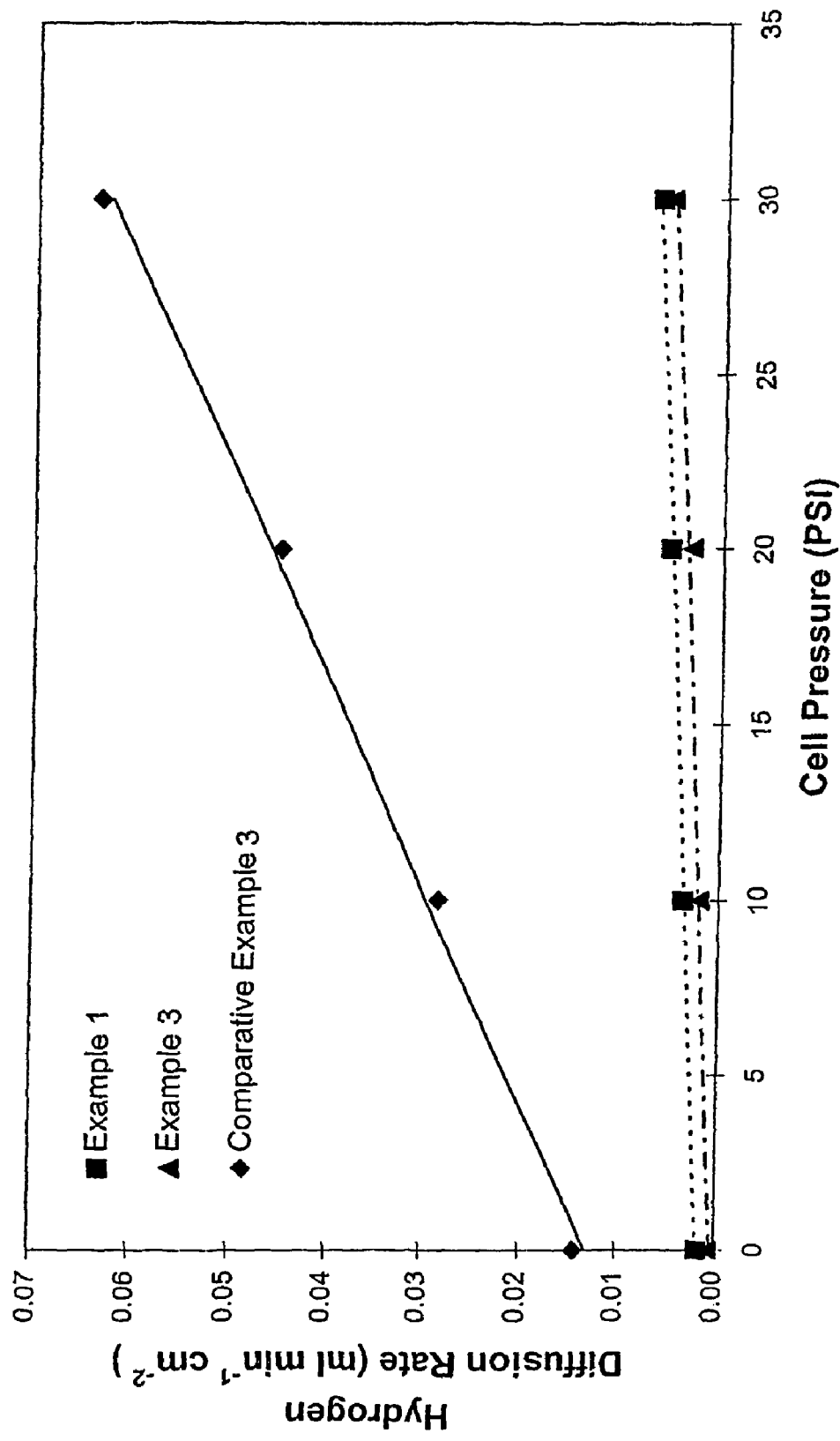
FIG. 3 is a graphical representation of hydrogen permeability for 30 μm thick membranes based on data from example 1, example 3, and comparative example 3.

FIG. 3 compares hydrogen permeability data for 30 µm thick membranes made from the polymers of examples 1 and 3 with comparative membrane 4 (Flemion® SH-30), which is also 30 µm thick. At all pressures, the Flemion® membrane shows significantly higher hydrogen permeabilities than the membranes of the invention. Consequently, the membranes in this invention are better gas separators than the perfluorinated material.

Fuel Cell Performance

MEAs containing membranes made from the polymers of example 1 and comparative example 4 were produced by sandwiching the membranes between two electrodes in the electrochemical cell under a load that compresses the MEA by about 20%. The 3.1 cm$^2$ active area electrodes were prepared using Toray TGP-H-60 carbon fibre current collecting substrate that was coated with a combination of carbon black, polytetrafluoroethylene polymer, platinum black electrocatalyst and Nafion® ionomer. The fabricated electrodes and membranes were pre-wetted in pure water prior to testing to ensure full hydration.

The MEAs were characterised using steady state electrochemical polarisation experiments to determine the performance of the membranes. They were tested in a fuel cell at 80° C. by supplying humidified hydrogen to the anode and humidified oxygen to the cathode, both at a pressure of 30 psig. Current interrupt experiments were then carried out to determine the ionic resistance of the membranes.

Figure 4:
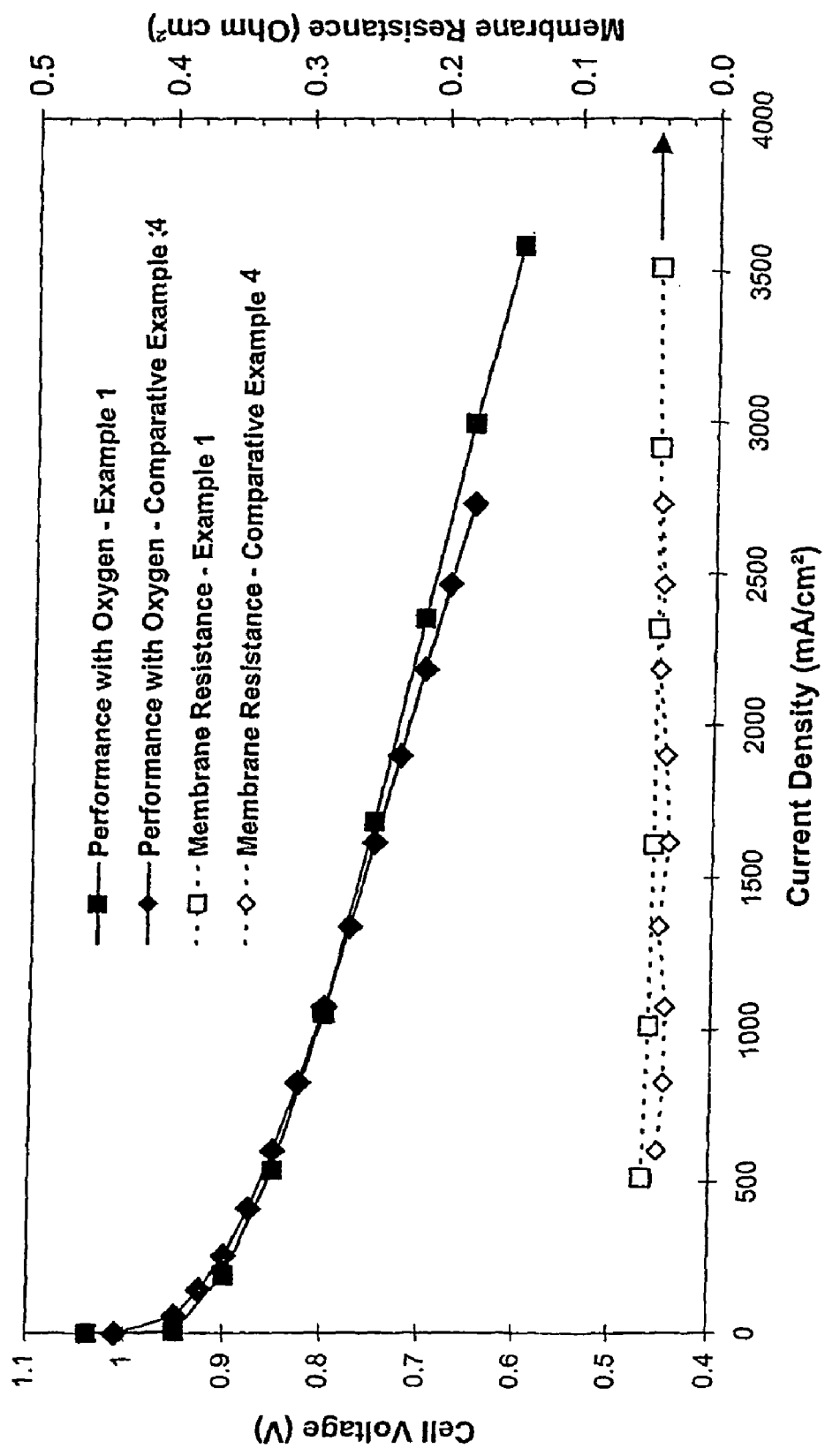
FIG. 4 is a graphical representation of fuel cell performance and membrane ionic resistance for 30 μm thick membranes based on data from example 1 and comparative example 4.

FIG. 4 presents the fuel cell performance and the membrane ionic resistance data from tests carried out with 30 µm thick membranes. The current-voltage performance and ionic resistance of the membrane made from the polymer of Example 1 is comparable to that of the Flemion® SH-30 membrane (comparative example 4).

Figure 5:
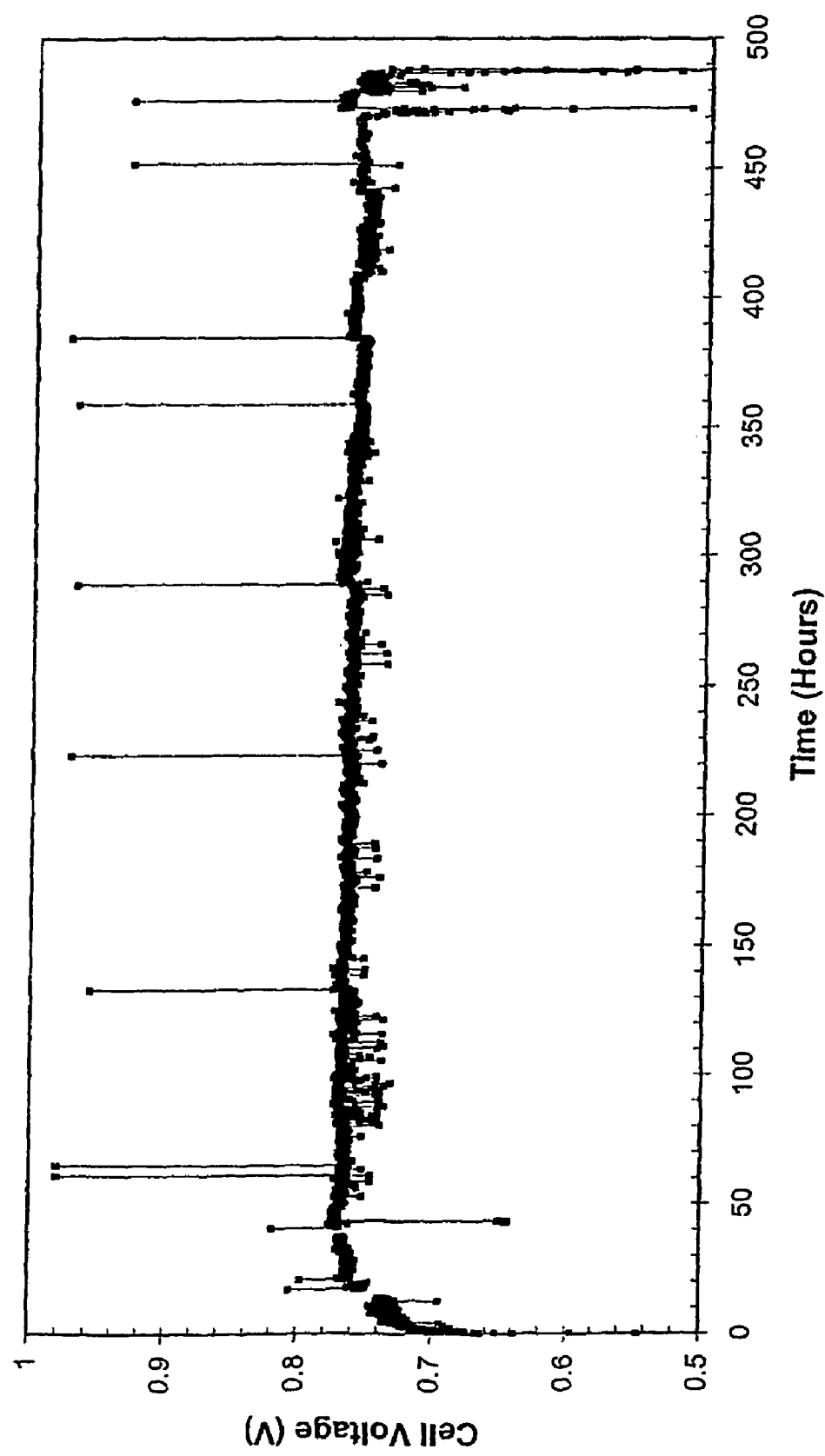
FIG. 5 is a graphical representation of durability data for membrane performance for 500 hrs based on data from example 1.

The long-term performance of a membrane made using a polymer according to the invention was determined with fuel cell testing over an extended duration until the performance of the MEA failed e.g. through the formation of pin-holes. Fully humidified hydrogen and air were supplied to the MEA, which contained 35 µm thick membrane made from the polymer of Example 1. Testing was carried out at 80° C. at a pressure of 30 psig at a constant current of 500 mA/cm$^2$ with the same electrodes detailed previously, but with an active area of 49 cm$^2$. FIG. 5 presents the durability data which shows that the membrane made from the polymer of Example 1 is durable for nearly 500 hours before failure.

The performance of 40 μm thick membrane made from the polymer of Example 1 in a direct methanol fuel cell (DMFC) was determined. The anode was supplied with 0.75 M aqueous methanol fuel and the cathode was supplied with dry air. The anode electrode was made using Toray TGP-H-90 carbon fibre current collecting substrate that is coated with a combination of carbon black, carbon supported platinum-ruthenium electrocatalyst and Nafion® ionomer. The cathode was prepared using Toray TGP-H-90 carbon fibre current collecting substrate coated with a combination of carbon black, polytetrafluoroethylene polymer, platinum black electrocatalyst and Nafion® ionomer.

Figure 6:
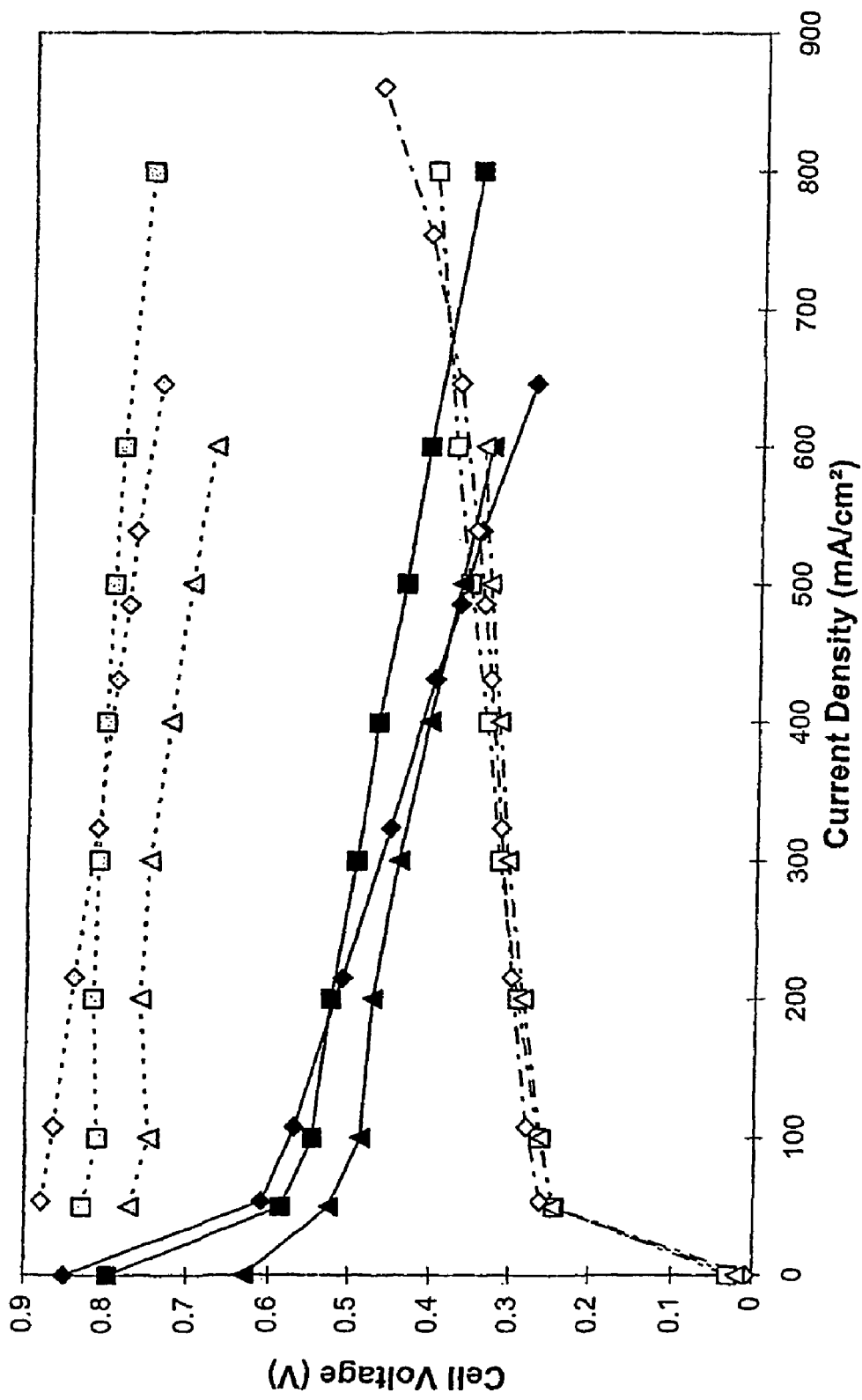
FIG. 6 is a graphical representation of cell performance, resistance corrected cathode performance and resistance corrected anode performance for a 40 μm thick membrane based on data from example 1.

FIG. 6 shows fuel cell data which compares the performance of an MEA containing a 40 μm thick membrane made from the polymer of Example 1 with MEAs containing comparative membrane 5 (Nafion® 117) and comparative membrane 6 (Nafion® 112). The nine lines represent cell performance (black symbols), resistance corrected cathode performance (grey symbols) and resistance corrected anode performance (white symbols) for example 1 (square symbols), comparative membrane 5 (diamond symbols) and comparative membrane 5 (triangular symbols). The cell performance data shows that the MEA that contains the membrane of the invention gives higher performance than the thickest sample, Nafion® 117, at current densities greater than 200 mA/cm$^2$. The cell performance data also shows that the MEA containing the polymer of example 1 shows a significant performance improvement at all current densities over the MEA that contains Nafion® 112 membrane, which is of comparable thickness.

FIG. 6 also shows that the performance of the anode electrode in each MEA is seen to be similar at all current densities. The performance of the cathode electrode is seen to vary considerably. The cathode electrode is seen to perform higher in the MEA sample containing the polymer of example 1 than in the MEA sample containing comparative example 6, although the thickness of both membranes is roughly comparable. This shows that membrane produced according to this invention is less fuel permeable. High levels of fuel permeability through the membrane materials used in the DMFC is a well-established phenomena that significantly reduces the efficiency of the device.

The invention claimed is:

1. A polymer consisting of linked units, wherein each of at least 80% of the linked units consists of one ion-conducting region and one spacer region connected thereto, wherein
    a) the ion-conducting region consists of one or more aromatic groups, each of the one or more aromatic groups being adjacent to at least one electron-donating group and each of the one or more aromatic groups having attached thereto at least one pendant ion-conducting functional group, wherein if the ion-conducting region includes two or more aromatic groups, then at least two of the aromatic groups are optionally connected by electron-donating groups; and
    b) the spacer region consists of at least four aromatic groups, each of the at least four aromatic groups being adjacent to at least one electron-withdrawing group and none of the at least four aromatic groups having attached thereto an ion-conducting functional group, wherein at least two of the at least four aromatic groups are optionally connected by electron-withdrawing groups.

2. A polymer according to claim 1, wherein at least 95% of the linked units consist of the ion-conducting region and the spacer region.

3. A polymer according to claim 1, wherein the one or more aromatic groups in the ion-conducting region is/are selected from the group consisting of phenylene, napthylene and anthracenylene groups.

4. A polymer according to claim 1, wherein each aromatic group in the ion-conducting region is adjacent to an electron-donating group.

5. A polymer according to claim 4, wherein the electron-donating group is an ether group.

6. A polymer according to claim 1, wherein the at least one pendant ion-conducting functional group attached to each of the one or more aromatic groups in the ion-conducting region is a sulphonic acid group.

7. A polymer according to claim 1, wherein the ratio of the number of aromatic groups in the spacer region to the number of aromatic groups in the ion-conducting region is at least 2:1.

8. A polymer according to claim 1, wherein the at least four aromatic groups in the spacer region are selected from the group consisting of phenylene, napthylene and anthracenylene groups.

9. A polymer according to claim 1, wherein the at least four aromatic groups in the spacer region are connected by electron withdrawing groups.

10. A polymer according to claim 9, wherein the electron-withdrawing groups are sulphone or ketone groups.

11. A polymer according to claim 1, which has an equivalent weight of less than 800 g mol$^{-1}$.

12. A polymer according to claim 1, which has an inherent viscosity of greater than 1.0 dl/g.

13. A polymer solution comprising a polymer according to claim 1.

14. A polymer electrolyte membrane comprising a polymer according to claim 1.

15. An electrocatalyst layer on a substrate wherein the electrocatalyst layer comprises a polymer according to claim 1.

16. A membrane electrode assembly comprising one or both of a polymer electrolyte membrane and an electrocatalyst layer on a substrate, wherein the polymer electrolyte membrane and the electrocatalyst layer comprise a polymer according to claim 1.

* * * * *